(12) United States Patent
Tajiri (10) Patent No.: US 9,553,449 B2
(45) Date of Patent: Jan. 24, 2017

(54) POWER SUPPLY APPARATUS, METHOD OF CONTROLLING POWER SUPPLY, AND BASE STATION APPARATUS

(71) Applicant: FUJITSU LIMITED, Kawasaki-shi, Kanagawa (JP)

(72) Inventor: Yuji Tajiri, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/689,566

(22) Filed: Apr. 17, 2015

(65) Prior Publication Data

US 2015/0326011 A1 Nov. 12, 2015

(30) Foreign Application Priority Data

May 8, 2014 (JP) ................. 2014-096549

(51) Int. Cl.
*H04M 1/00* (2006.01)
*H02J 1/00* (2006.01)
*H04W 88/08* (2009.01)

(52) U.S. Cl.
CPC ............... *H02J 1/00* (2013.01); *H04W 88/08* (2013.01); *Y10T 307/696* (2015.04)

(58) Field of Classification Search
CPC .... H03F 3/245; H03F 2200/336; H03F 3/195; H03F 1/0227; H03F 1/0277; H03F 2200/451; H03F 3/211; H03F 1/0261; H03F 2200/537; H03F 3/72; H03F 2200/171; H03F 2200/222; H03F 2200/27; H03F 2200/318; H02J 7/345; H02J 7/0004; H02J 7/32; H02J 7/0006; H02J 7/0003; H02J 9/061; H02J 9/062; H01M 10/4257; H01M 10/42; H01M 10/48; H01M 10/44; H01M 2/1022; H01M 10/0525; H01M 10/484; H01M 10/486; H01M 2220/30; H01M 10/02; H01M 10/045

See application file for complete search history.

(56) References Cited

U.S. PATENT DOCUMENTS

| | | | |
|---|---|---|---|
| 6,420,906 B1 | 7/2002 | Kohda | |
| 2002/0093317 A1 | 7/2002 | Matsuda et al. | |
| 2010/0102882 A1* | 4/2010 | Yoshino | ............... B41J 2/04541 330/251 |
| 2011/0125436 A1* | 5/2011 | Watanabe | .......... G01R 31/3679 702/65 |

(Continued)

FOREIGN PATENT DOCUMENTS

| | | |
|---|---|---|
| JP | 2001-236131 A | 8/2001 |
| JP | 2002-112469 A | 4/2002 |
| JP | 2007-228659 A | 9/2007 |

*Primary Examiner* — Golam Sorowar
(74) *Attorney, Agent, or Firm* — Arent Fox LLP (57) ABSTRACT

A power supply apparatus includes: a plurality of input ports configured to receive input of electric power from a plurality of power sources, respectively; a charge and discharge circuit configured to receive the input electric power to be charged and discharged so as to generate electric power to be supplied to a load circuit; a switching circuit configured to individually switch connections between the plurality of input ports and the charge and discharge circuit; and a control circuit configured to perform control so as to give different timing of the switch among the input ports.

16 Claims, 6 Drawing Sheets

(56) References Cited

U.S. PATENT DOCUMENTS

| | | | |
|---|---|---|---|
| 2011/0227414 A1* | 9/2011 | Fischer | H02J 7/0019 307/66 |
| 2012/0116601 A1* | 5/2012 | Yano | G06F 1/30 700/292 |
| 2013/0026845 A1* | 1/2013 | Mohel | H02M 1/44 307/89 |
| 2013/0207475 A1* | 8/2013 | Dong | H02J 9/06 307/80 |
| 2014/0062203 A1* | 3/2014 | Hirata | H02J 9/061 307/66 |
| 2014/0176076 A1* | 6/2014 | Momo | H01M 10/46 320/128 |
| 2014/0184172 A1* | 7/2014 | Momo | H02J 7/0057 320/160 |
| 2015/0048794 A1* | 2/2015 | Park | H02J 7/0016 320/118 |

* cited by examiner

POWER SUPPLY APPARATUS, METHOD OF CONTROLLING POWER SUPPLY, AND BASE STATION APPARATUS

CROSS-REFERENCE TO RELATED APPLICATIONS

This application is based upon and claims the benefit of priority of the prior Japanese Patent Application No. 2014-096549, filed on May 8, 2014, the entire contents of which are incorporated herein by reference.

FIELD

The embodiments discussed herein are related to a power supply apparatus, a method of controlling power supply, and a base station apparatus.

BACKGROUND

Power supply apparatuses, such as a power source circuit using a DC-DC converter, or the like are known (for example, refer to Japanese Laid-open Patent Publication Nos. 2002-112469, 2001-236131, and 2007-228659).

The power supply apparatuses control power supply timing to a charge and discharge circuit so as to adjust power to be generated.

The power supply apparatuses are sometimes provided with a plurality of power sources. Even if a power supply apparatus is provided with a plurality of power sources, the maximum power that is allowed to be supplied by the power supply apparatus is sometimes restricted to the maximum power allowed to be supplied by individual power sources.

SUMMARY

According to an aspect of the invention, a power supply apparatus includes: a plurality of input ports configured to receive input of electric power from a plurality of power sources, respectively; a charge and discharge circuit configured to receive the input electric power to be charged and discharged so as to generate electric power to be supplied to a load circuit; a switching circuit configured to individually switch connections between the plurality of input ports and the charge and discharge circuit; and a control circuit configured to perform control so as to give different timing of the switch among the input ports.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a description will be given of embodiments of the present disclosure with reference to the drawings. Note that the embodiments described below are examples. Accordingly, in the following, it is not excluded that various variations and techniques not stated explicitly are applied to the embodiments. In this regard, in the drawings used in the following embodiments, a part to which the same symbol is given represents the same or a similar part unless changes or variations are specifically described.

First Embodiment

Configuration

Figure 1:
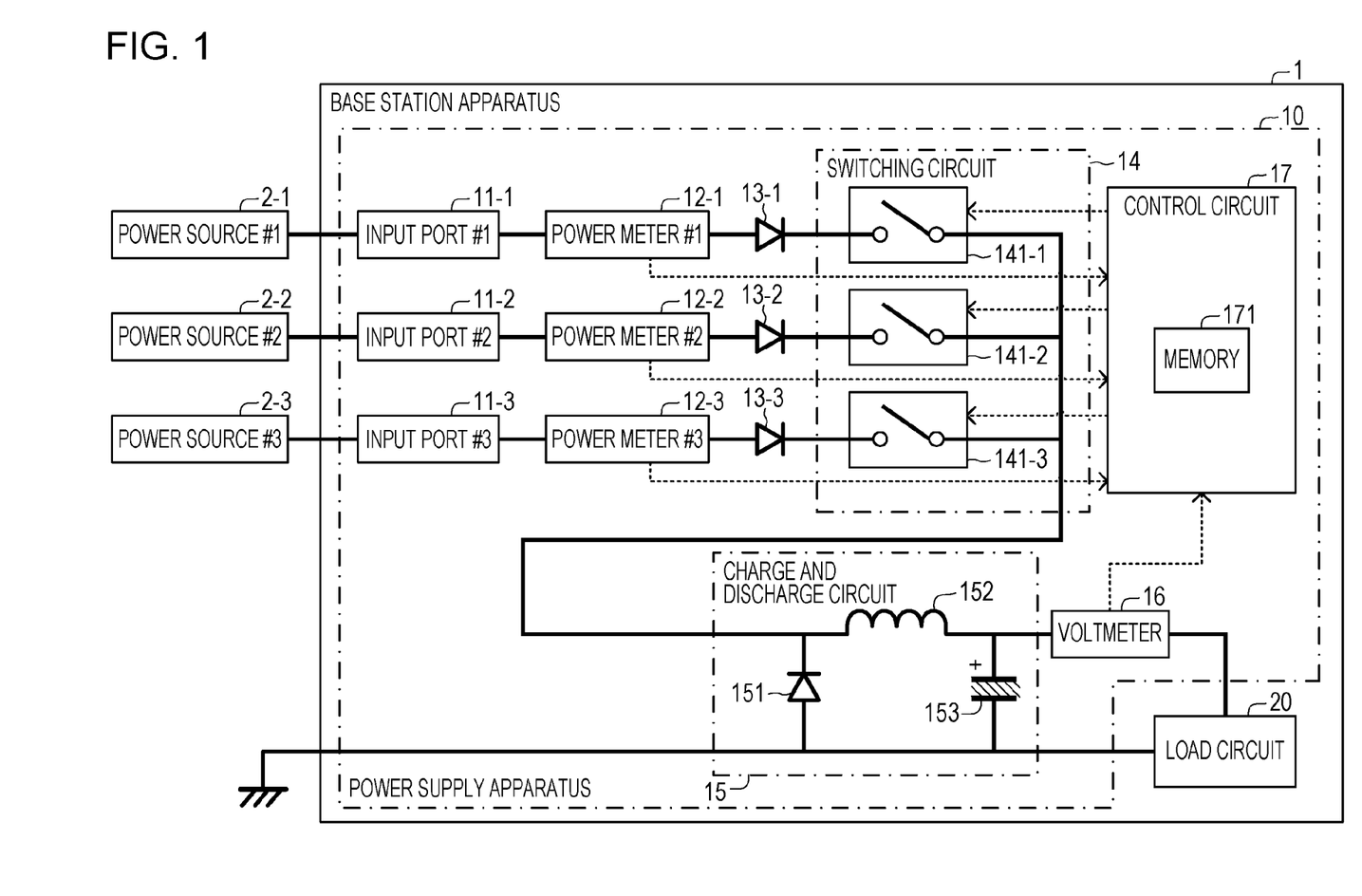
FIG. 1 is a block diagram illustrating an example of a configuration of a base station apparatus according to a first embodiment.

As illustrated in FIG. 1, a base station apparatus 1 according to a first embodiment includes a power supply apparatus 10, and a load circuit 20, for example. The power supply apparatus 10 supplies power to the load circuit 20. An example of the load circuit 20 is a radio signal processing circuit. The radio signal processing circuit transmits and receives a radio signal in accordance with a predetermined radio communication method.

For example, the radio communication method is an LTE system. The LTE is an abbreviation of Long Term Evolution. In this regard, the radio communication method may be a system other than the LTE system (for example, a system, such as LTE-Advanced, WiMAX, or the like). WiMAX is an abbreviation of Worldwide Interoperability for Microwave Access.

In this example, the power supply apparatus 10 is a DC-DC converter of a switching system or a chopper system. In this example, the power supply apparatus 10 decreases voltage. In this regard, the power supply apparatus 10 may increase voltage.

The power supply apparatus 10 includes three input ports 11-1 to 11-3, three electric power meters 12-1 to 12-3, and three rectifying devices 13-1 to 13-3, for example. Further, the power supply apparatus 10 includes a switching circuit 14, a charge and discharge circuit 15, a voltmeter 16, and a control circuit 17, for example. The switching circuit 14 includes three switching elements 141-1 to 141-3, for example. The voltmeter 16 is an example of a detection unit.

The input port 11-$i$, the electric power meter 12-$i$, the rectifying device 13-$i$, and the switching element 141-$i$ may be called the i-th input system, or the input system #i. In this example, i represents an integer from 1 to 3.

In this regard, the power supply apparatus 10 may include two, or four or more input systems.

A power source 2-$i$ is sometimes represented as a power source #i. The input port 11-$i$ is sometimes represented as an input port #i or IP #i. The electric power meter 12-$i$ is sometimes represented as an electric power meter #i. The switching element 141-$i$ is sometimes represented as an SW #i.

In this example, the power source 2-$i$ is connected to the input port 11-$i$. An example of the power source 2-$i$ is a battery that supplies a direct current with a predetermined voltage. Supplying a direct current with a predetermined voltage is an example of supplying electric power. The power source 2-$i$ supplies electric power to the input port 11-$i$.

The input port 11-$i$ is connected to the switching element 141-$i$ through the electric power meter 12-$i$ and the rectifying device 13-$i$. For example, the rectifying device 13-$i$ may be a diode.

The electric power meter 12-$i$ detects electric power input from the power source 2-$i$ to the charge and discharge circuit 15 through the input port 11-$i$. In this example, the electric power meter 12-$i$ detects a current input from the through power source 2-$i$ to the charge and discharge circuit 15 through the input port 11-$i$, and a voltage applied to the input port 11-$i$, and outputs a value produced by time-averaging the product of the detected current and the voltage as an electric power.

The switching element 141-$i$ switches connections between the rectifying device 13-$i$ and the charge and discharge circuit 15. For example, the switching element 141-$i$ may be a field-effect transistor (FET). For example, the FET may be a metal-oxide-semiconductor (MOS) FET. Also, the switching element 141-$i$ may be a diode OR circuit.

In this example, when the switching element 141-$i$ connects the rectifying device 13-$i$ and the charge and discharge circuit 15, electric power input into the input port 11-$i$ is supplied to the charge and discharge circuit 15. In this example, when the switching element 141-$i$ disconnects the rectifying device 13-$i$ from the charge and discharge circuit 15, electric power input into the input port 11-$i$ is not supplied to the charge and discharge circuit 15.

The state in which the switching element 141-$i$ connects the rectifying device 13-$i$, and the charge and discharge circuit 15 is an example of the state of the switching element 141-$i$ connecting the input port 11-$i$ and the charge and discharge circuit 15. The state in which the switching element 141-$i$ disconnects the rectifying device 13-$i$ from the charge and discharge circuit 15 is an example of the state of the switching element 141-$i$ disconnecting the input port 11-$i$ from the charge and discharge circuit 15.

When the switching element 141-$i$ connects the rectifying device 13-$i$ and the charge and discharge circuit 15, it is sometimes expressed that the switching element 141-$i$ is switched on. When the switching element 141-$i$ disconnects the rectifying device 13-$i$ from the charge and discharge circuit 15, it is sometimes expressed that the switching element 141-$i$ is switched off.

To put it another way, the switching element 141-$i$ switches a connection state in which the rectifying device 13-$i$ and the charge and discharge circuit 15 are connected, and a disconnection state in which the rectifying device 13-$i$ and the charge and discharge circuit 15 are disconnected. The connection state is an example of the state in which electric power input into the input port 11-$i$ is supplied to the charge and discharge circuit 15. The disconnection state is an example of the state in which electric power input into the input port 11-$i$ is not supplied to the charge and discharge circuit 15.

The charge and discharge circuit 15 receives electric power input from a plurality of input ports 11-1 to 11-3 to be charged and discharged to generate electric power, and supplies the generated electric power to the load circuit 20. In this example, the charge and discharge circuit 15 is charged when electric power is input, and is discharged electric power when electric power is not input.

The charge and discharge circuit 15 is connected to the load circuit 20 through the voltmeter 16. The charge and discharge circuit 15 includes a rectifying device 151, a coil 152, and a capacitor 153, for example. For example, the rectifying device 151 may be a diode. For example, the coil 152 may be a choke coil. For example, the capacitor 153 may be an electrolytic capacitor.

The voltmeter 16 detects the voltage applied to the load circuit 20.

The control circuit 17 includes a memory 171, for example.

The memory 171 stores a maximum power $\alpha_i$ that the power source 2-$i$ connected to the input port 11-$i$ is allowed to supply in association with the input port 11-$i$. The maximum power $\alpha_i$ is an example of the threshold power value set in the power source 2-$i$. The maximum power is sometimes represented as an electric power capacity.

The control circuit 17 controls the switching timing of the plurality of switching elements 141-1 to 141-3 such that the voltage supplied by the charge and discharge circuit 15 to the load circuit 20 comes close to a predetermined target value $V_{target}$.

In this example, the control circuit 17 switches the plurality of switching elements 141-1 to 141-3 to be turned on in sequence one by one for each passage of a predetermined cycle T. In this example, the control circuit 17 keeps each switching element 141-$i$ on for a supply time $L_i$ set for the switching element 141-$i$, and then switches off.

In this example, the supply time $L_i$ is set to a time period that is shorter than the above-described cycle T. Thereby, a period in which electric power is not supplied to the charge and discharge circuit 15 is set.

In this manner, the control circuit 17 makes the switching timings of the switching elements 141-1 to 141-3 different among the input ports 11-1 to 11-3 so as to make the timing to supply electric power to the charge and discharge circuit 15 different among the input ports 11-1 to 11-3.

Further, in this example, the control circuit 17 adjusts the supply time $L_i$ based on the voltage detected by the voltmeter 16.

In this example, in the case where the voltage detected by the voltmeter 16 is lower than a first threshold voltage value $V_{th1}$, if the electric power $P_i$ detected by the electric power meter 12-$i$ is less than the maximum power $\alpha_i$ of the power source 2-$i$, the control circuit 17 extends the supply time $L_i$ by a predetermined variation $\Delta L$. In this example, the first threshold voltage value $V_{th1}$ is a value produced by subtracting a predetermined first margin $\Delta V_1$ from the target value $V_{target}$. In this example, the first margin $\Delta V_1$ has a positive value. In this regard, the variation of the supply time $L_i$ may be changed in accordance with the difference between the detected voltage, and the first threshold voltage value $V_{th1}$.

In this example, in the case where the voltage detected by the voltmeter 16 is lower than the first threshold voltage value $V_{th1}$, if the electric power $P_i$ detected by the electric power meter 12-$i$ is equal to or higher than the maximum power $\alpha_i$ detected by the power source 2-$i$, the control circuit 17 does not change the supply time $L_i$. In this manner, the control circuit 17 adjusts the supply time $L_i$ such that the electric power input from each of the plurality of power sources 2-1 to 2-3 becomes equal to or less than the threshold power value (the maximum power $\alpha_i$ in this example) set for each power source.

In this regard, the control circuit 17 uses the maximum power $\alpha_i$ of the power source 2-$i$ as a basis for determining whether to extend the supply time $L_i$, but may use a value that is smaller than the maximum power $\alpha_i$ of the power source 2-$i$ by a predetermined margin.

In this example, in the case where the voltage detected by the voltmeter 16 is higher than a second threshold voltage value $V_{th2}$, the control circuit 17 shortens the supply time $L_i$ by the above-described variation $\Delta L$. In this example, the second threshold voltage value $V_{th2}$ is a value produced by adding a predetermined second margin $\Delta V_2$ to the target value $V_{target}$. In this example, the second margin $\Delta V_2$ has a positive value. In this regard, the variation of the supply time $L_i$ may be changed in accordance with the difference between the detected voltage and the second threshold voltage value $V_{th2}$.

In this regard, the first margin $\Delta V_1$ may be the same as or different from the second margin $\Delta V_2$. Also, the variation $\Delta L$ of the supply time $L_i$ may be different in the case of increasing the supply time $L_i$ from the case of decreasing the supply time $L_i$.

In this example, the control circuit 17 detects abnormality of each of the plurality of power sources 2-1 to 2-3 based on the electric power detected by the plurality of electric power meters 12-1 to 12-3. In this example, if the electric power detected by the electric power meter 12-$i$ is less that a predetermined threshold value (for example, 0), the control circuit 17 detects that the power source 2-$i$ is abnormal. In this example, if the electric power detected by the electric power meter 12-$i$ is higher than the above-described threshold value, the control circuit 17 detects that the power source 2-$i$ is normal.

In this example, the control circuit 17 controls the plurality of switching elements 141-1 to 141-3 such that a power source 2-$m$, which is different from a power source 2-$n$ from which abnormality has been detected, is used as a power source to supply electric power to the charge and discharge circuit 15. Reference symbol n represents an integer from 1 to 3. Reference symbol m represents an integer from 1 to 3 that is different from n.

To put it another way, in this example, the control circuit 17 continues to keep off the switching element 141-$n$ in the input system #n to which the power source 2-$n$ having the detected abnormality is connected. Accordingly, in this example, the control circuit 17 turns on the switching element 141-$m$ in the input system #m to which the power source 2-$m$, which is different from the power source 2-$n$ having the detected abnormality, is connected in sequence one by one for each passage of the above-described cycle T.

In this regard, the power supply apparatus 10 may be provided with a processing unit, and a storage device in place of the control circuit 17. In this case, the processing unit executes a program stored in the storage device so as to achieve the same function as that of the control circuit 17.

Operation

Next, a description will be given of operation of the base station apparatus 1. Here, a description will be given of parts related to the power supply apparatus 10 out of the operation of the base station apparatus 1.

Figure 2:
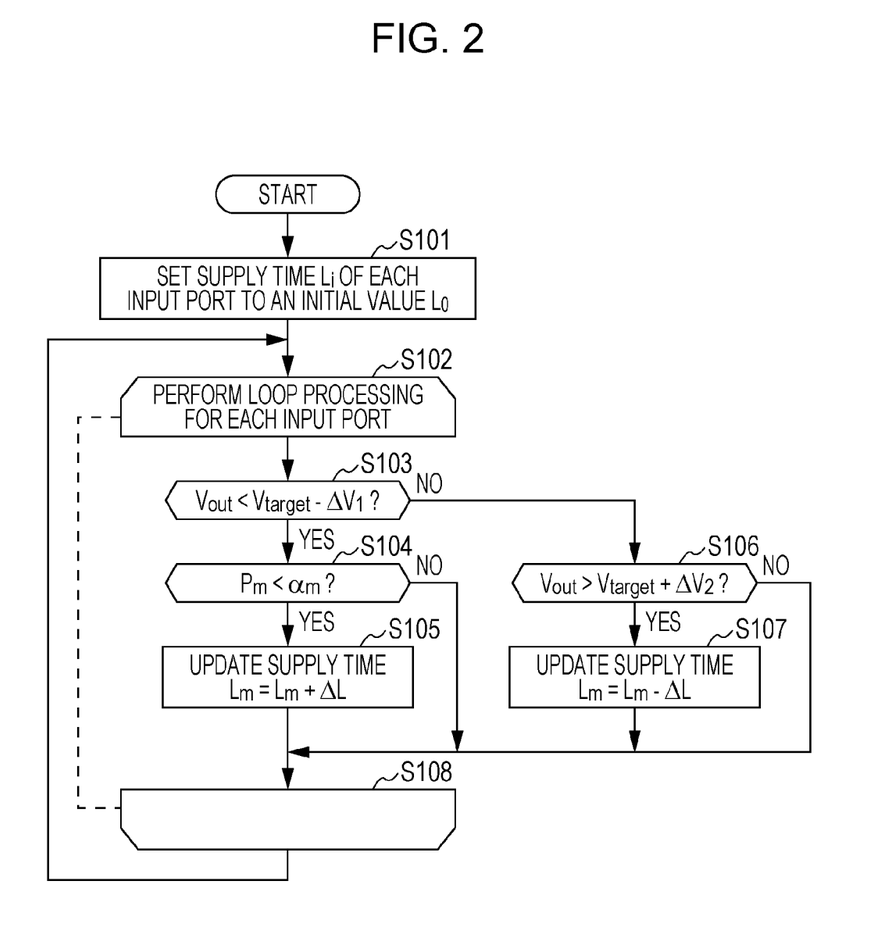
FIG. 2 is a flowchart illustrating an example of processing executed by the control circuit in FIG. 1.

The control circuit 17 of the power supply apparatus 10 performs processing illustrated by a flowchart in FIG. 2.

The control circuit 17 sets the supply time $L_i$ of each input port 11-$i$ to a predetermined initial value $L_0$ (step S101 in FIG. 2). In this example, the supply time $L_i$ of the input port 11-$i$ is a supply time $L_i$ that is set for the switching element 141-$i$ in the input system #i including the input port 11-$i$.

Next, the control circuit 17 executes loop processing (step S102 to step S108 in FIG. 2) for each of the plurality of input ports 11-1 to 11-3 one by one in sequence.

In the loop processing, first, the control circuit 17 determines whether the voltage $V_{out}$ detected by the voltmeter 16 is lower than the first threshold voltage value $V_{th1}$ (=$V_{target}$−$\Delta V_1$) (step S103 in FIG. 2).

If the detected voltage $V_{out}$ is lower than the first threshold voltage value $V_{th1}$, the control circuit 17 determines as "Yes", and determines whether electric power $P_m$ detected by the electric power meter 12-$m$ is less than a threshold power value $\alpha_m$ (step S104 in FIG. 2). Reference symbol m represents a port number for identifying the input port 11-$m$ to be processed in the above-described loop processing.

If the detected electric power $P_m$ is less than the threshold power value $\alpha_m$, the control circuit 17 determines as "Yes", updates supply time $L_m$ to the sum value of the supply time $L_m$ and the variation $\Delta L$, that is to say, $L_m+\Delta L$ (step S105 in FIG. 2), and the processing proceeds to step S108 in FIG. 2.

On the other hand, if the detected electric power $P_m$ is equal to or greater than the threshold power value $\alpha_m$, the control circuit 17 determines as "No", and the processing proceeds to step S108 in FIG. 2 without changing the supply time $L_m$.

Also, if the detected voltage $V_{out}$ is equal to or higher than the first threshold voltage value $V_{th1}$, the control circuit 17 determines as "No" in step S103, and determines whether the voltage $V_{out}$ is higher than the second threshold voltage value $V_{th2}$ (=$V_{target}$+$\Delta V_2$) (step S106 in FIG. 2).

If the detected voltage $V_{out}$ is higher than the second threshold voltage value $V_{th2}$, the control circuit 17 determines as "Yes", and updates the supply time $L_m$ to the value produced by subtracting the variation $\Delta L$ from the supply time $L_m$, that is to say, $L_m-\Delta L$ (step S107 in FIG. 2), and the processing proceeds to step S108 in FIG. 2.

On the other hand, if the detected voltage $V_{out}$ is equal to or less than the second threshold voltage value $V_{th2}$, the control circuit 17 determines as "No", and processing proceeds to step S108 in FIG. 2 without changing the supply time $L_m$.

Then, after the control circuit 17 executes the above-described loop processing (step 102 to step S108 in FIG. 2) for all of the plurality of input ports 11-1 to 11-3, the processing returns to step S102, and the above-described loop processing is repeated.

Figure 3:
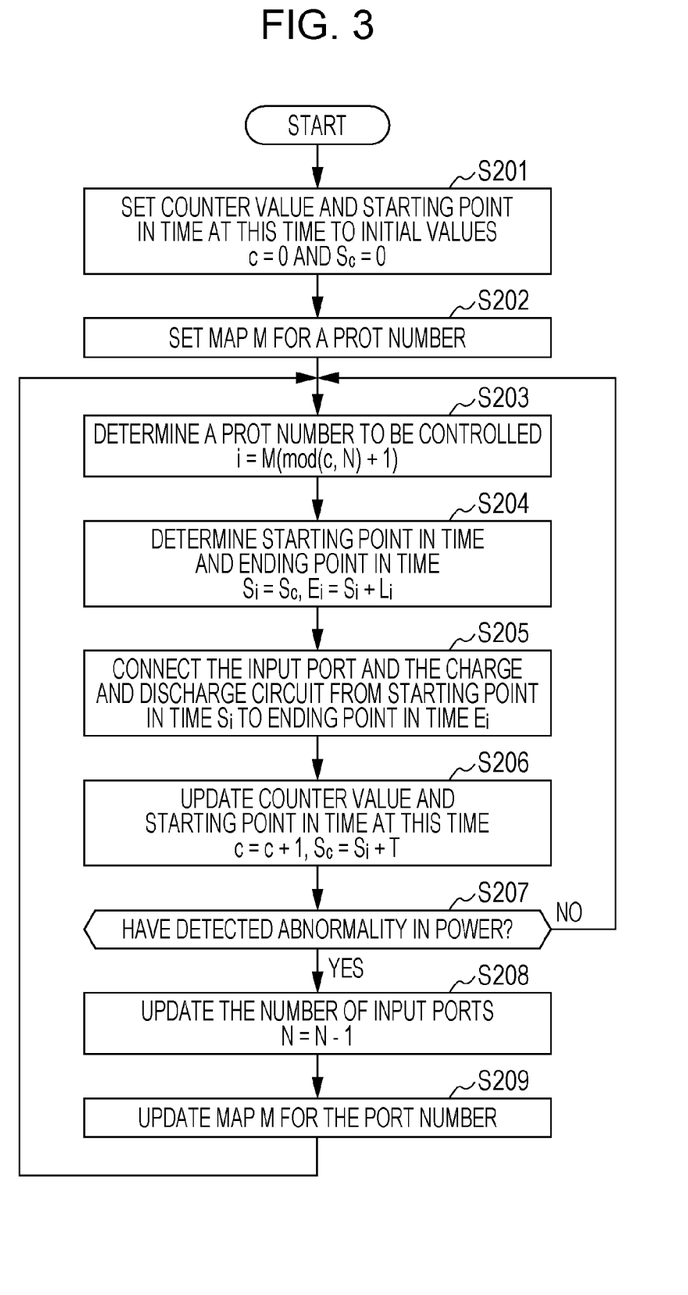
FIG. 3 is a flowchart illustrating an example of processing executed by the control circuit in FIG. 1.

Further, the control circuit 17 executes the processing illustrated by a flowchart in FIG. 3.

The control circuit 17 sets the counter value c to a predetermined initial value (0 in this example), and sets the starting point in time $S_c$ at this time to a predetermined initial value (0 in this example) (step S201 in FIG. 3).

In this example, the counter value c represents the number of times that the control of turning off the switching elements 141-1 to 141-3 after turning them on has been performed. Also, the starting point in time $S_c$ at this time is a point in time when the switching elements 141-1 to 141-3 is switched on in the above-described control scheduled to be performed this time.

Next, the control circuit 17 sets the sate of a map M for a port number to a predetermined initial state (step S202 in FIG. 3). In this example, the map M outputs an integer as the output value corresponding to the input value when an integer is input as an input value. In this example, the initial state of the map M is the state of outputting the same value as the input value i as an output value i when an input value i is input.

Next, the control circuit 17 determines the port number i to be subjected to the above-described control based on Expression1 (step S203 in FIG. 3). Reference symbol N is the number of input ports, which is the number of the input ports 11-1 to 11-3 to which normal power sources 2-1 to 2-3 are connected. In this example, the initial value of the number of input ports N is 3. By Expression1, if the map M is set to an initial state, the port number i repeats to be incremented one by one from 1 to N as the counter value c increases.

$$i=M(\mathrm{mod}(c,N)+1) \quad (1)$$

Then, the control circuit 17 determines a starting point in time $S_i$ and an ending point in time $E_i$, for the input port 11-$i$ identified by the port number i (step S204 in FIG. 3). In this example, the starting point in time $S_i$ and the ending point in time $E_i$ for the input port 11-$i$ are the starting point in time $S_i$ and the ending point in time $E_i$, respectively, for the switching element 141-$i$ in the input system #i including the input port 11-$i$.

The starting point in time $S_i$ is a point in time when the switching element 141-$i$ is switched from off to on. The ending point in time $E_i$ is a point in time when the switching element 141-$i$ is switched from on to off.

In this example, the control circuit 17 sets the starting point in time $S_i$ to a point in time $S_c$ at this time. Further, the control circuit 17 sets the ending point in time $E_i$ to a point in time after the supply time $L_i$ from the starting point in time $S_i$.

Next, the control circuit 17 waits for time when the set starting point in time $S_i$ has come, and switches the switching element 141-$i$ from off to on at the set starting point in time $S_i$. Then, the control circuit 17 waits for time when the set ending point in time $E_i$ has come, and switches the switching element 141-$i$ from on to off at the set ending point in time $E_i$.

Thereby, the control circuit 17 causes the switching element 141-$i$ to connect the input port 11-$i$ and the charge and discharge circuit 15 so that the electric power input into the input port 11-$i$ during a period from the starting point in time $S_i$ to the ending point in time $E_i$ is supplied to the charge and discharge circuit 15 (step S205 in FIG. 3).

Next, the control circuit 17 updates the counter value c to the sum value c+1, which is produced by adding 1 to the counter value c, and updates the starting point in time $S_c$ at this time to the sum value $S_i+T$, which is produced by adding the cycle T to the starting point in time $S_i$ (step S206 in FIG. 3). In this example, the cycle T is a predetermined value $T_0$.

Then, the control circuit 17 detects abnormality of each of the plurality of power sources 2-1 to 2-3 based on the electric power detected by the plurality of electric power meters 12-1 to 12-3 (step S207 in FIG. 3).

If abnormality is not detected in any one of the plurality of power sources 2-1 to 2-3, the control circuit 17 determines as "No", the processing returns to step S203, and the processing from step S203 to step S209 described below is executed repeatedly.

On the other hand, if abnormality is detected in any one of the plurality of power sources 2-1 to 2-3, the control circuit 17 determines as "Yes", and updates the number of input ports N to a value produced by subtracting 1 from the number of input ports N, N−1 (step S208 in FIG. 3).

Next, the control circuit 17 updates the state of the map M for the port number (step S209 in FIG. 3). In this example, the control circuit 17 updates the state of the map M such that when an input value is input, a port number identifying a normal input port is output as an output value. For example, if the control circuit 17 has detected abnormality of the power source 2-1, the control circuit 17 updates the state of the map M to a state of individually outputting 3 and 2 as output values if 1 and 2 are input as input values.

Thereby, it is possible to determine that a port number determined in step S203 is a port number for identifying a normal input port.

After that, the control circuit 17 returns to step S203 in FIG. 3, and the processing of step S203 to step S209 are executed repeatedly.

Figure 4:
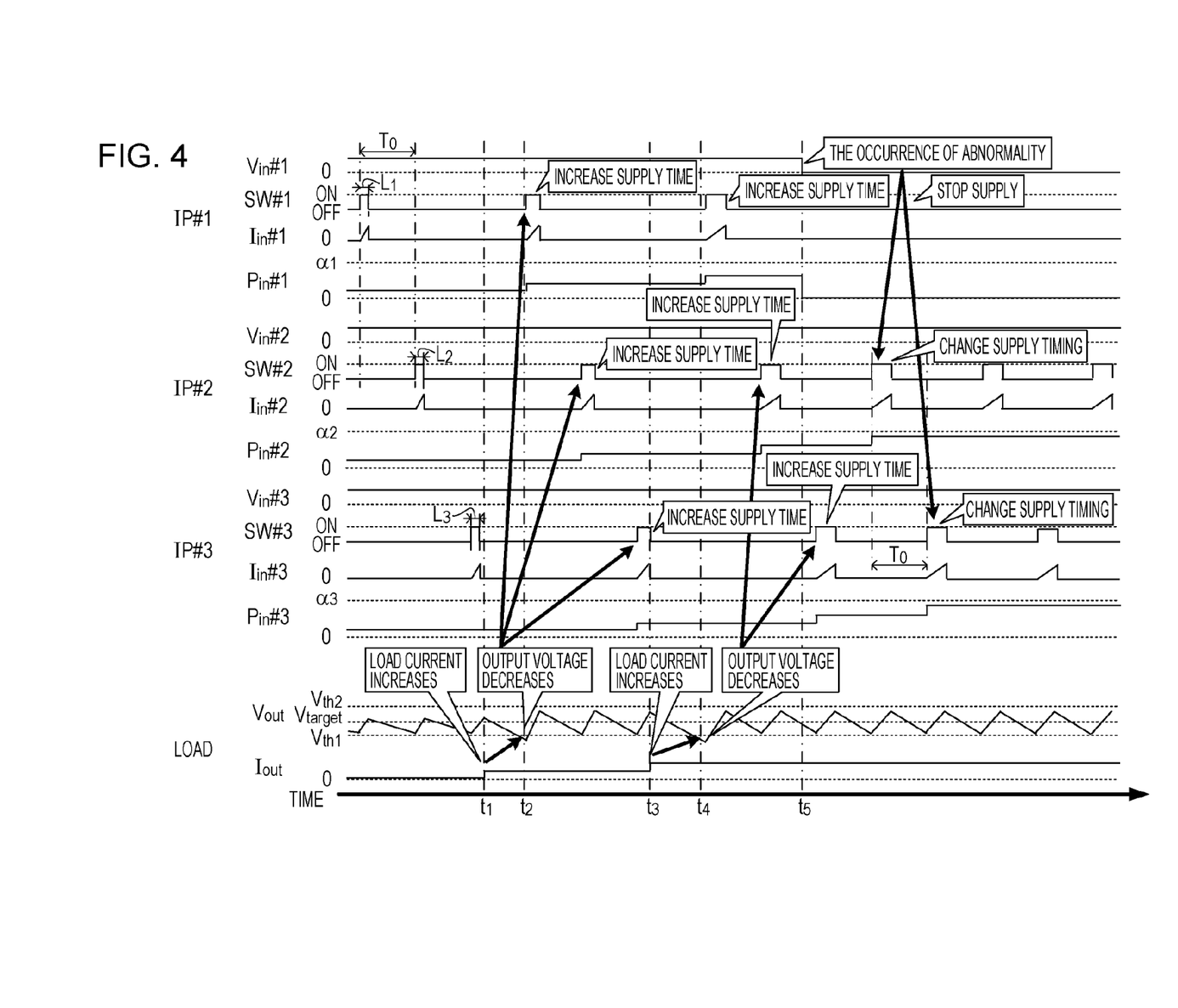
FIG. 4 is a time chart illustrating an example of operation of the power supply apparatus in FIG. 1.

Next, a description will be given of the state of the power supply apparatus 10 with reference to FIG. 4. In FIG. 4, $V_{in}$ #i represents a voltage to be applied by the power source 2-$i$ to the power supply apparatus 10. Reference symbol $I_{in}$ #i represents a current supplied by the power source 2-$i$ to the power supply apparatus 10. Reference symbol $P_{in}$ #i represents an electric power supplied by the power source 2-$i$ to the power supply apparatus 10. Reference symbol SW #i represents a state of the switching element 141-$i$ in the input system #i. "ON" represents a connection state, and "OFF" represents a disconnection state. Reference symbol $V_{out}$ represents a voltage applied by the power supply apparatus 10 to the load circuit 20. Reference symbol $I_{out}$ represents a current supplied by the power supply apparatus 10 to the load circuit 20.

In the example illustrated in FIG. 4, in a period before a point in time a voltage $V_{out}$ detected by the voltmeter 16 is higher than a first threshold voltage value $V_{th1}$, and lower than a second threshold voltage value $V_{th2}$.

Accordingly, in this period, the control circuit 17 determines as "No" in both steps S103 and S106 in FIG. 2, and does not change the supply time $L_m$ (the "No" route of step S106 in FIG. 2). Also, in this period, the control circuit 17 determines as "No" in step S207 in FIG. 3, and does not change the supply time $L_m$, the number of input ports N, and the map M (the "No" route of step S207 in FIG. 3).

Then, at a point in time $t_1$, the load current increases. The load current is a current supplied to the load circuit 20. With an increase in the load current, the voltage $V_{out}$ detected by the voltmeter 16 decreases. Thereby, at a point in time $t_2$, the voltage $V_{out}$ detected by the voltmeter 16 becomes lower than the first threshold voltage value $V_{th1}$.

At a point in time $t_2$, the control circuit 17 determines as "Yes" both in steps S103 and S104 in FIG. 2, and increases the supply time $L_m$ (step S105 in FIG. 2).

At a point in time $t_2$, the control circuit 17 determines as "No" in step S207 in FIG. 3, and does not change the supply time $L_m$, the number of input ports N, and the map M (the "No" route of step S207 in FIG. 3).

Then, at a point in time $t_3$, the load current increases again. With an increase in the load current, the voltage $V_{out}$ detected by the voltmeter 16 decreases. Thereby, at a point in time $t_4$, the voltage $V_{out}$ detected by the voltmeter 16 becomes lower than the first threshold voltage value $V_{th1}$.

At the point in time $t_4$, the control circuit 17 determines as "Yes" both in steps S103 and S104 in FIG. 2, and increases the supply time $L_m$ (step S105 in FIG. 2).

At the point in time $t_4$, the control circuit 17 determines as "No" in step S207 in FIG. 3, and does not change the supply time $L_m$, the number of input ports N, and the map M (the "No" route of step S207 in FIG. 3).

Then, abnormality of the power source 2-1 occurs at a point in time $t_5$. Thereby, the electric power $P_{in}$ #1 detected by the electric power meter 12-1 becomes 0. Accordingly, at a point in time $t_5$, the control circuit 17 detects that the power source 2-1 is abnormal.

At a point in time $t_5$, the control circuit 17 determines as "No" in both steps S103 and S106 in FIG. 2, and does not change the supply time $L_m$ (the "No" route of step S106 in FIG. 2).

At a point in time $t_5$, the control circuit 17 determines as "Yes" in step S207 in FIG. 3, and changes the number of input ports N, and the map M (steps S208 and S209 in FIG. 3).

Thereby, in a period after the point in time $t_5$, the switching element 141-1 in the input system #1 continues to be kept off. Accordingly, the power source 2-1 is not used as a power source supplying electric power to the charge and discharge circuit 15. On the other hand, in a period after the point in time $t_5$, the power sources 2-2 and 2-3 are used for power sources supplying electric power to the charge and discharge circuit 15 alternately for each passage of the cycle T.

Accordingly, each of the switching elements 141-2 and 141-3 is switched on each passage of time 3T, which is three times the cycle T in a period before the point in time $t_5$. On the other hand, each of the switching elements 141-2 and 141-3 is switched on each passage of time 2T, which is two times the cycle T in a period after the point in time $t_5$.

In this manner, in this example, the control circuit 17 controls the switching circuit 14 such that the sum total of the supply time for the power sources 2-1 to 2-3 used for the power supply sources is kept fixed before and after a change of the number of power sources 2-1 to 2-3 used for power supply sources. The power supply sources are the power sources 2-1 to 2-3 for use as power sources that supply electric power to the charge and discharge circuit 15.

As described above, the power supply apparatus 10 according to the first embodiment performs control so as to give individually different timing to switch connections between the plurality of input ports 11-1 to 11-3 and the charge and discharge circuit 15 among the input ports 11-1 to 11-3.

Thereby, it is possible to supply the load circuit 20 with electric power exceeding the maximum power that is allowed to be supplied by the individual power sources 2-1 to 2-3.

Further, if the power supply apparatus 10 according to the first embodiment determines that the detected voltage $V_{out}$ is lower than the first threshold voltage value $V_{th1}$, the power supply apparatus 10 makes the connection time period between each of the input ports 11-1 to 11-3 and the charge and discharge circuit 15 longer after the determination than before the determination.

Thereby, it is possible to make the voltage applied to the load circuit 20 closer to the target value $V_{target}$.

In addition, in the power supply apparatus 10 according to the first embodiment, the connection time between each of the input ports 11-1 to 11-3 and the charge and discharge circuit 15 is adjusted such that electric power that is input from each of the plurality of power sources 2-1 to 2-3 is equal to or less than the threshold power value $\alpha_m$ set for each of the power source 2-1 to 2-3.

Thereby, it is possible to control to keep the electric power input from each of the power sources 2-1 to 2-3 equal to or less than the threshold power value $\alpha_m$. Thereby, it is possible to suppress variations of the electric power input from each of the power sources 2-1 to 2-3. As a result, it is possible to suppress variations of the electric power supplied to the load circuit 20.

Further, if the power supply apparatus 10 according to the first embodiment determines that the detected voltage $V_{out}$ is higher than the second threshold voltage value $V_{th2}$, the power supply apparatus 10 makes the connection time period between each of the input ports 11-1 to 11-3 and the charge and discharge circuit 15 shorter after the determination than before the determination.

Thereby, it is possible to make the voltage applied to the load circuit 20 closer to the target value $V_{target}$.

In addition, the power supply apparatus 10 according to the first embodiment detects abnormality of each of the plurality of power sources 2-1 to 2-3, and the power supply apparatus 10 disconnects the input ports 11-1, to which electric power is input from the power source 2-1 having the detected abnormality, from the charge and discharge circuit 15. To put it another way, the power supply apparatus 10 uses the power sources 2-2 and 2-3, which are different from the power source 2-1 having the detected abnormality, as the power sources for supplying electric power to the charge and discharge circuit 15.

Thereby, it is possible to generate electric power to be supplied to the load circuit 20 without using the power source 2-1 having the detected abnormality. Thereby, it is possible to suppress variations of the electric power supplied to the load circuit 20.

In this regard, the power supply apparatus 10 may change the number of power sources 2-1 to 2-3 to be used for the power supply source in accordance with the voltage $V_{out}$ detected by the voltmeter 16. For example, if the power supply apparatus 10 determines that the detected voltage $V_{out}$ is higher than the second threshold voltage value $V_{th2}$, the power supply apparatus 10 may decrease the number of the input ports 11-1 to 11-3 that are connected to the charge and discharge circuit 15 after the determination from that of before the determination. Also, for example, if the power supply apparatus 10 determines that the detected voltage $V_{out}$ is lower than the first threshold voltage value $V_{th1}$, the power supply apparatus 10 may increase the number of the input ports 11-1 to 11-3 that are connected to the charge and discharge circuit 15 from that of before the determination.

Thereby, it is possible to make the voltage applied to the load circuit 20 closer to the target value $V_{target}$.

Second Embodiment

Next, a description will be given of a base station apparatus according to a second embodiment of the present disclosure. The base station apparatus according to the second embodiment is different from the base station apparatus according to the first embodiment in the point that the cycle of switching the switching elements on and the supply time are changed in the case of changing the number of input ports. In the following, the description will be given with a central focus on such a difference.

Figure 5:
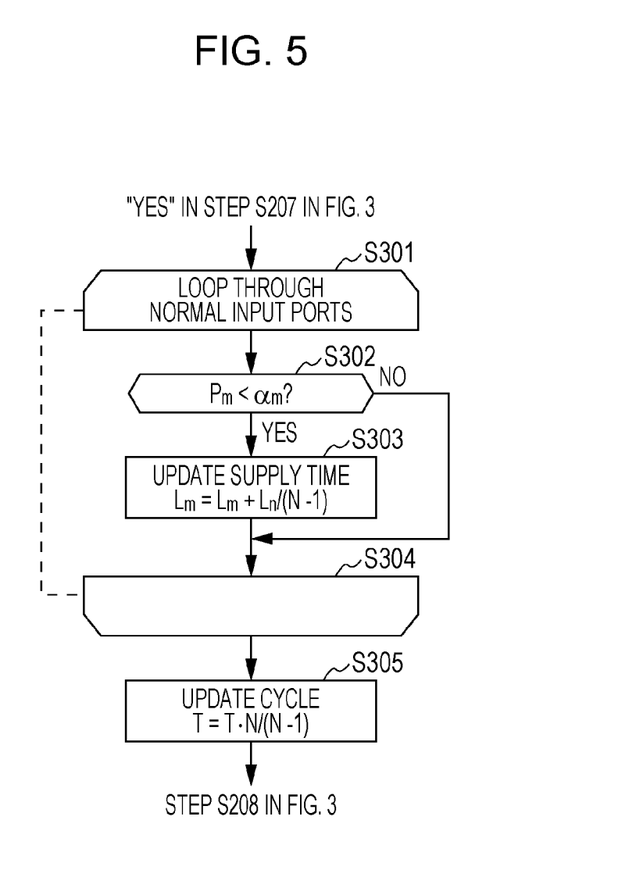
FIG. 5 is a flowchart illustrating an example of processing executed by a control circuit according to a second embodiment.

The control circuit 17 according to the second embodiment executes the processing produced by adding the processing of step S301 to step S305 in FIG. 5 between step S207 and step S208 in FIG. 3 in place of the processing illustrated in FIG. 3.

If the control circuit 17 determines as "Yes" in step S207 in FIG. 3, the processing proceeds to step S301 in FIG. 5.

Then, the control circuit 17 executes the loop processing (step S301 to step S304 in FIG. 5) for each of the normal input ports to be processed one by one in sequence. The normal input port is an input port 11-m that is different from the input ports 11-n to which a power source 2-n having the detected abnormality. For example, if abnormality is detected in the power source 2-1, the normal input ports are the input ports 11-2 and 11-3. Accordingly, in this case, n denotes 1, and m denotes 2 or 3.

In the loop processing, first, the control circuit 17 determines whether the electric power $P_m$ detected by the electric power meter 12-m is less than the threshold power value $\alpha_m$ (step S302 in FIG. 5).

If the detected electric power $P_m$ is less than the threshold power value $\alpha_m$, the control circuit 17 determines as "Yes", updates the supply time $L_m$ based on the Expression2 (step S303 in FIG. 5), and the processing proceeds to step S304 in FIG. 5.

$$L_m = L_m + L_1/(N-1) \qquad (2)$$

In this manner, in this example, the control circuit 17 changes the supply time such that the sum total of the supply time for the power sources 2-1 to 2-3 used for the power supply sources is kept fixed before and after a change of the number of power sources 2-1 to 2-3 used for power supply sources. The power supply sources are the power sources 2-1 to 2-3 for use as power sources that supply electric power to the charge and discharge circuit 15.

On the other hand, if the detected electric power $P_m$ is equal to or greater than the threshold power value $\alpha_m$, the control circuit 17 determines as "No", and the processing proceeds to step S304 in FIG. 5 without changing the supply time $L_m$.

Then, the control circuit 17 executes the above-described loop processing (step S301 to step S304 in FIG. 5) on all the normal input ports 11-2 and 11-3, and then the processing proceeds to step S305 in FIG. 5.

Next, the control circuit 17 updates the cycle T based on Expression3 (step S305 in FIG. 5), and the processing proceeds to step S208 in FIG. 3.

$$T = T \cdot N/(N-1) \qquad (3)$$

Thereby, the control circuit 17 switches the plurality of switching elements 141-2 and 141-3 to be turned on one by one in sequence for each passage of a predetermined cycle T after the change of the number of the power sources 2-1 to 2-3 to be used for the power supply source.

Figure 6:
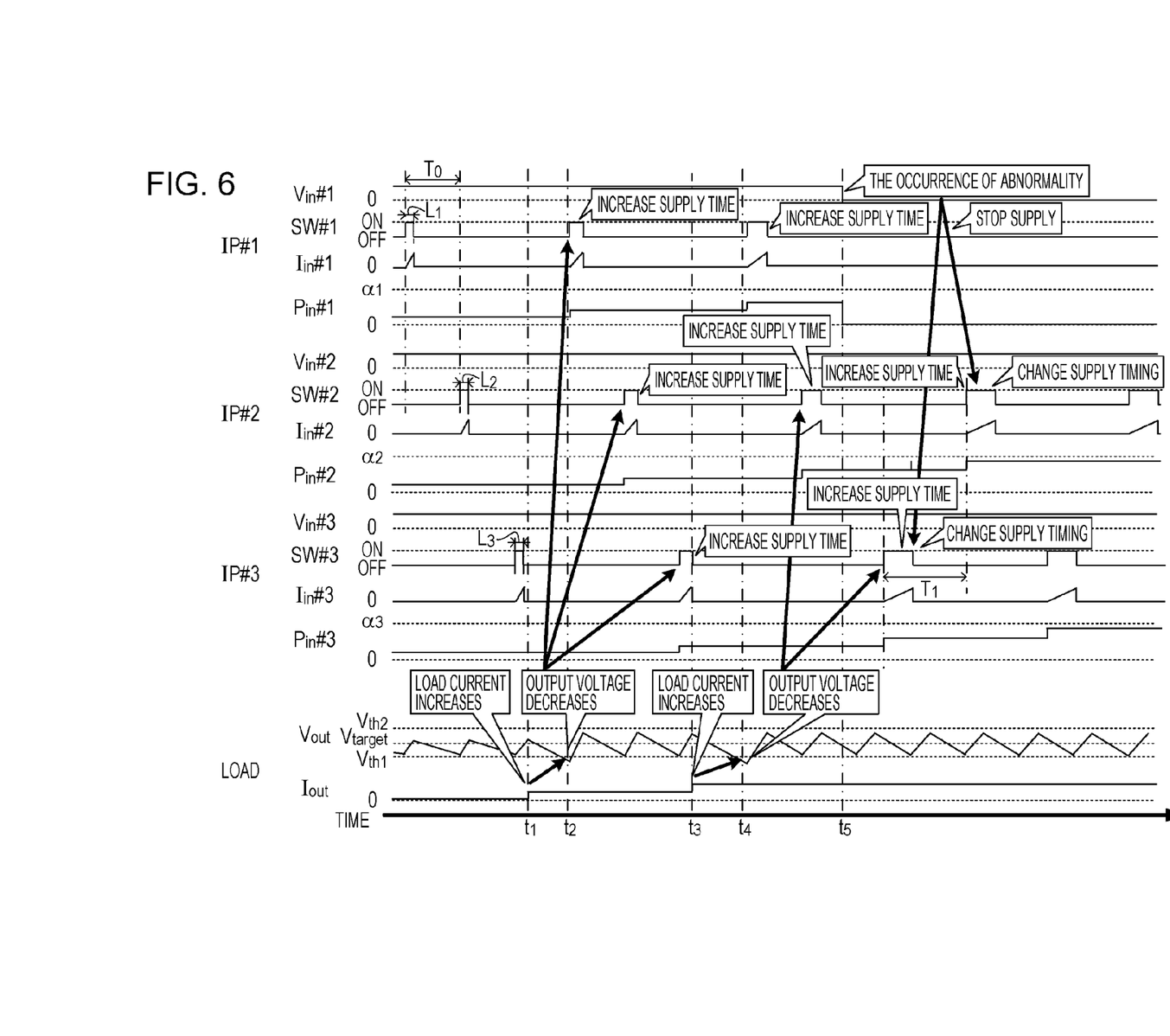
FIG. 6 is a time chart illustrating an example of operation of a power supply apparatus according to the second embodiment.

Next, a description will be given of the state of the power supply apparatus 10 with reference to FIG. 6. In FIG. 6, $V_{in}$ #i represents a voltage to be applied by the power source 2-$i$ to the power supply apparatus 10. Reference symbol $I_{in}$ #i represents a current supplied by the power source 2-$i$ to the power supply apparatus 10. Reference symbol $P_{in}$ #i represents an electric power supplied by the power source 2-$i$ to the power supply apparatus 10. Reference symbol SW #i represents a state of the switching element 141-$i$ in the input system #i. "ON" represents a connection state, and "OFF" represents a disconnection state. Reference symbol $V_{out}$ represents a voltage applied by the power supply apparatus 10 to the load circuit 20. Reference symbol $I_{out}$ represents a current supplied by the power supply apparatus 10 to the load circuit 20.

In the period before a point in time $t_5$, the power supply apparatus 10 operates in the same manner as the power supply apparatus 10 according to the first embodiment.

Then, abnormality of the power source 2-1 occurs at a point in time $t_5$. Thereby, the electric power $P_{in}$ #1 detected by the electric power meter 12-1 becomes 0. Accordingly, at a point in time $t_5$, the control circuit 17 detects that the power source 2-1 is abnormal.

At a point in time $t_5$, the control circuit 17 determines as "No" in both steps S103 and S106 in FIG. 2, and does not change the supply time $L_m$ (the "No" route of step S106 in FIG. 2).

At a point in time $t_5$, the control circuit 17 determines as "Yes" in step S207 in FIG. 3, and changes the supply time $L_m$, the cycle T, the number of input ports N, and the map M (steps S303 and S305 in FIG. 5, and steps S208 and S209 in FIG. 3).

Thereby, in a period after the point in time $t_5$, the switching element 141-1 in the input system #1 continues to be kept off. Accordingly, the power source 2-1 is not used as a power source supplying electric power to the charge and discharge circuit 15. On the other hand, in a period after the point in time $t_5$, the power sources 2-2 and 2-3 are used for power sources supplying electric power to the charge and discharge circuit 15 alternately for each passage of the cycle T. In this example, the cycle T in a period before the point in time $t_5$ is a predetermined value $T_0$. In this example, the cycle T in a period after the point in time $t_5$ is a value $T_1$ (=1.5 $T_0$), which is N/(N−1) times the value $T_0$.

Accordingly, each of the switching elements 141-2 and 141-3 is switched on each passage of time $3T_0$, which is three times the cycle $T_0$ in a period before the point in time $t_5$. In the same manner, each of the switching elements 141-2 and 141-3 is switched on each passage of time $3T_0$, which is three times the cycle $T_0$ in a period after the point in time $t_5$.

On the other hand, the control circuit 17 adds a value produced by dividing the supply time $L_1$, which has been set to the input ports 11-1 at a point in time when abnormality of the power source 2-1 has been detected, by the number of normal input ports to each of the supply time $L_2$ and $L_3$ for the normal input ports 11-2 and 11-3, respectively.

In this manner, in this example, the control circuit 17 controls the switching circuit 14 such that the sum total of the supply time for the power sources 2-1 to 2-3 used for the power supply sources is kept fixed before and after a change of the number of power sources 2-1 to 2-3 used for the power supply sources.

As described above, in the same manner as the power supply apparatus 10 according to the first embodiment, the power supply apparatus 10 according to the second embodiment performs control so as to give individually different timing to switch connections between the plurality of input ports 11-1 to 11-3 and the charge and discharge circuit 15 among the input ports 11-1 to 11-3.

Thereby, it is possible to supply the load circuit 20 with electric power exceeding the maximum power that is allowed to be supplied by the individual power sources 2-1 to 2-3.

Also, in the power supply apparatus 10 according to the second embodiment, if abnormality of the power source 2-1 is detected, the cycle T is extended. Thereby, it is possible to make a time period of not supplying electric power to the power supply apparatus 10 for each of the power sources 2-1 to 2-3 longer than that of the power supply apparatus 10 according to the first embodiment. As a result, it is possible to restrain deterioration of the power sources 2-1 to 2-3.

In this regard, as another variation of the above-described embodiments, any combination of the above-described embodiments and variations may be employed.

Also, in the above-described embodiments, the power supply apparatus or the method of controlling power supply are applied to a base station apparatus. However, the power supply apparatus or the method of controlling power supply may be applied to an apparatus other than a base station apparatus (for example, a relay apparatus, a radio communication apparatus, a communication control apparatus, or the like).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power supply apparatus comprising:
a plurality of input ports configured to receive input of electric power from a plurality of power sources, respectively;
a charge and discharge circuit configured to receive the input electric power to be charged and discharged so as to generate electric power to be supplied to a load circuit;
a plurality of switching circuits, each provided for the respective input ports, configured to individually connect between the respective input ports and the charge and discharge circuit;
a detection unit configured to detect a voltage applied to the load circuit; and
a control circuit configured to perform control on the plurality of switching circuits so as to connect the plurality of input ports to the charge and discharge circuit in sequence one by one for each cycle and make, based on a detected voltage, connection time period in a current cycle to the charge and discharge circuit and connection time period in a previous cycle to the charge and discharge circuit different.

2. The power supply apparatus according to claim 1, wherein the control includes determination of whether the detected voltage is lower than a first threshold voltage value, and if determined that the voltage is lower than the first threshold voltage value, control to make the connection time period in the current cycle longer than the connection time period in the previous cycle.

3. The power supply apparatus according to claim 2, wherein the control includes control to adjust the connection time period so as to make power input from each of the plurality of power sources not higher than a threshold power value set for each of the power sources.

4. The power supply apparatus according to claim 2, wherein the control includes determination of whether the detected voltage is higher than a second threshold voltage value, and if determined that the voltage is higher than the second threshold voltage value, control to make the connection time period in the current cycle shorter than the connection time period in the previous cycle.

5. The power supply apparatus according to claim 1, further comprising:
a detection unit configured to detect a voltage applied to the load circuit,
wherein the control includes determination of whether the detected voltage is lower than a first threshold voltage value, and if determined that the voltage is lower than the first threshold voltage value, control to increase the number of the input ports connected to the charge and discharge circuit in the current cycle compared to the previous cycle.

6. The power supply apparatus according to claim 1, further comprising:
a detection unit configured to detect a voltage applied to the load circuit, wherein the control includes determination of whether the detected voltage is higher than a second threshold voltage value, and if determined that the voltage is higher than the second threshold voltage value, control to decrease the number of the input ports connected to the charge and discharge circuit in the current cycle compared to the previous cycle.

7. The power supply apparatus according to claim 1, wherein the control circuit is configured to detect abnormality of each of the plurality of power sources, and the control includes control to disconnect an input port receiving power input from a power source, from which the abnormality is detected among the plurality of input ports, from the charge and discharge circuit.

8. The power supply apparatus according to claim 1, further comprising:
a plurality of electric power meters, each provided between the respective input ports and the respective switching circuits, configured to detect power input from the respective power sources.

9. A method of controlling power supply, the method comprising:
receiving, in a plurality of input ports, input of electric power from a plurality of power sources, respectively;
receiving, in a charge and discharge circuit, the input electric power to be charged and discharged so as to generate electric power to be supplied to a load circuit;
detecting a voltage applied to the load circuit;
performing control on a plurality of switching circuits each provided for the respective input ports so as to connect the plurality of input ports to the charge and discharge circuit in sequence one by one for each cycle; and
making, based on a detected voltage, connection time period in a current cycle to the charge and discharge circuit and connection time period in a previous cycle to the charge and discharge circuit different.

10. The method of controlling power supply according to claim 9,
wherein the control includes determining of whether the detected voltage is lower than a first threshold voltage value, and if determined that the voltage is lower than the first threshold voltage value, controlling to make the connection time period in the current cycle longer than the connection time period in the previous cycle.

11. The method of controlling power supply according to claim 10, wherein the control includes controlling to adjust the connection time period so as to make power input from each of the plurality of power sources not higher than a threshold power value set for each of the power sources.

12. The method according to claim 9, further comprising:
detecting, in a plurality of electric power meters each provided between the respective input ports and the respective switching circuits, power input from the respective power sources.

13. A base station apparatus comprising:
a load circuit configured to transmit and receive a radio signal;
a power supply apparatus configured to supply power to the load circuit, the power supply apparatus including:
a plurality of input ports configured to receive input of electric power from a plurality of power sources, respectively,
a charge and discharge circuit configured to receive the input electric power to be charged and discharged so as to generate electric power to be supplied to a load circuit,
a plurality of switching circuits, each provided for the respective input ports, configured to individually connect between the respective input ports and the charge and discharge circuit, a detection unit configured to detect a voltage applied to the load circuit, and a control circuit configured to perform control on the plurality of switches so as to connect the plurality of input ports to the charge and discharge circuit in sequence one by one for each cycle and make, based on a detected voltage, connection time period in a current cycle to the charge and discharge circuit and connection time period in a previous cycle to the charge and discharge circuit different.

14. The base station apparatus according to claim 13, wherein the control includes determination of whether the detected voltage is lower than a first threshold voltage value, and if determined that the voltage is lower than the first threshold voltage value, control to make the connection time period in the current cycle longer than the connection time period in the previous cycle.

15. The base station apparatus according to claim 14, wherein the control includes control to adjust the connection time period so as to make power input from each of the plurality of power sources not higher than a threshold power value set for each of the power sources.

16. The base station apparatus according to claim 13, further comprising:

a plurality of electric power meters, each provided between the respective input ports and the respective switching circuits, configured to detect power input from the respective power sources.

* * * * *